US009564161B1

United States Patent
Cherubini et al.

(10) Patent No.: US 9,564,161 B1
(45) Date of Patent: Feb. 7, 2017

(54) METHOD FOR CONTROLLING THE LATERAL POSITION OF A TAPE HEAD OF A MAGNETIC TAPE DRIVE

(71) Applicant: INTERNATIONAL BUSINESS MACHINES CORPORATION, Armonk, NY (US)

(72) Inventors: Giovanni Cherubini, Rueschlikon (CH); Simeon Furrer, Rueschlikon (CH); Mark A. Lantz, Rueschlikon (CH); Angeliki Pantazi, Rueschlikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/937,028

(22) Filed: Nov. 10, 2015

(51) Int. Cl.
G11B 15/18 (2006.01)
G11B 5/588 (2006.01)

(52) U.S. Cl.
CPC .................................... *G11B 5/588* (2013.01)

(58) Field of Classification Search
None
See application file for complete search history.

(56) References Cited

U.S. PATENT DOCUMENTS

| 7,961,421 | B1* | 6/2011 | Bui | G11B 5/584 360/76 |
| 8,643,975 | B2* | 2/2014 | Cherubini | G11B 5/56 360/76 |
| 8,780,486 | B2* | 7/2014 | Bui | G11B 5/584 360/76 |
| 9,019,651 | B2* | 4/2015 | Bui | G11B 5/584 360/77.01 |
| 9,218,839 | B2* | 12/2015 | Cherubini | G11B 5/584 |

\* cited by examiner

*Primary Examiner* — K. Wong
(74) *Attorney, Agent, or Firm* — Cantor Colburn LLP; Daniel Morris

(57) ABSTRACT

Embodiments include methods, systems and computer program products for controlling a lateral position of a tape head of a magnetic tape drive. Aspects include determining a first servo signal by reading position marks from a first servo band on a magnetic tape using a first sensor and determining a second servo signal by reading position marks from a second servo band on the magnetic tape using a second sensor. Aspects also include delaying the first servo signal relative to the second servo signal by a delay and calculating an average signal based on the first and the delayed second servo signal. Aspects further include determining servo information from the average signal indicative of a deviation of the lateral position of the tape head from an ideal lateral position of the tape head and controlling the tape head to adjust its lateral position such that the deviation is decreased.

20 Claims, 6 Drawing Sheets

METHOD FOR CONTROLLING THE LATERAL POSITION OF A TAPE HEAD OF A MAGNETIC TAPE DRIVE

BACKGROUND

The present invention relates to a method for controlling the lateral position of a tape head of a magnetic tape drive as well as to a corresponding magnetic tape drive and a computer program product.

In magnetic tape recording a magnetic tape transport system moves a magnetic tape from a cartridge reel to a take-up reel and vice versa guided by a set of rollers. Compressional waves oscillating between the rollers are excited by tape head friction and lead to high-frequency velocity variations observed in the server read back signal. In timing-based servo systems this causes a degradation of the track-following performance in particular if the compressional wave disturbance aliases into the frequency range where the track-following servo controller amplifies disturbances.

SUMMARY

Embodiments include methods, systems and computer program products for controlling a lateral position of a tape head of a magnetic tape drive. Aspects include determining a first servo signal by reading position marks from a first servo band on a magnetic tape using a first sensor and determining a second servo signal by reading position marks from a second servo band on the magnetic tape using a second sensor. Aspects also include delaying the first servo signal relative to the second servo signal by a delay to create a delayed second servo signal, wherein the delay is based on the frequency (f) of a longitudinal oscillation of the magnetic tape and calculating an average signal based on the first servo signal and the delayed second servo signal. Aspects further include determining a servo information from the average signal, the servo information being indicative of a deviation of the lateral position of the tape head from an ideal lateral position of the tape head relative to the magnetic tape and controlling the tape head to adjust its lateral position such that the deviation is decreased.

BRIEF DESCRIPTION OF THE DRAWINGS

In the following embodiments of the invention are explained in greater detail by way of example only making reference to the drawings in which.

DETAILED DESCRIPTION

Figure 1:
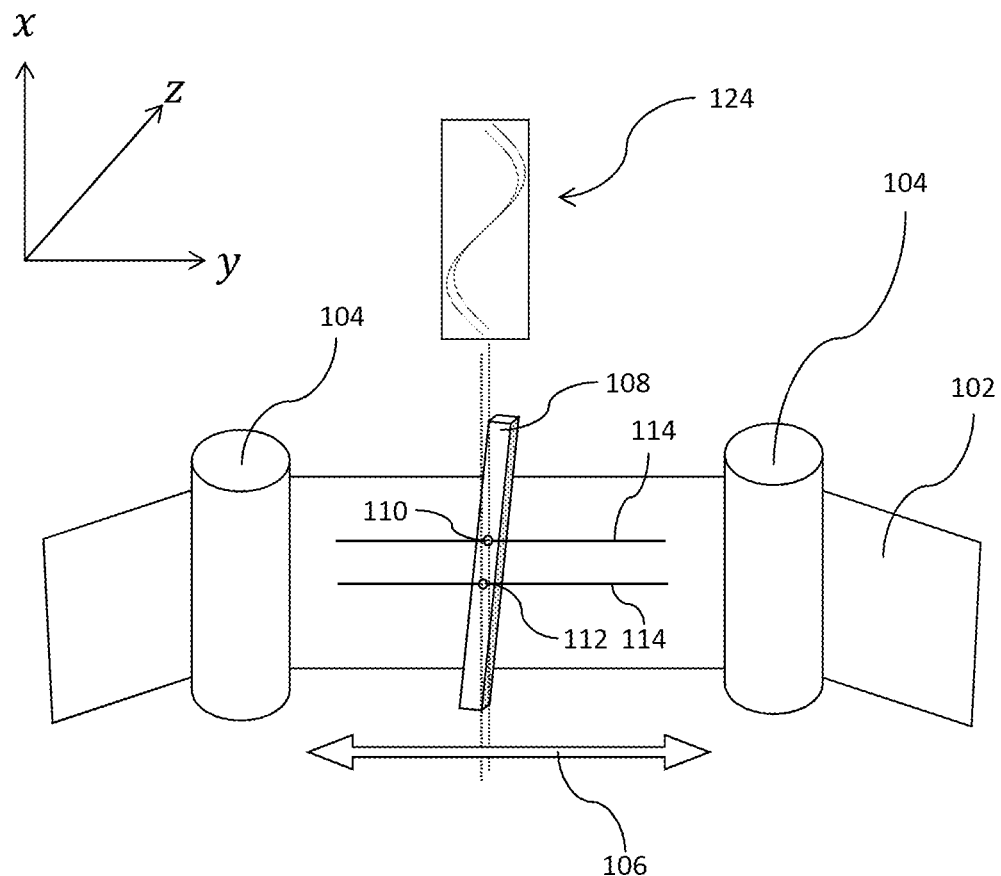
FIG. 1 depicts a schematic of the readout section of a tape drive.

In one aspect the invention relates to a method for controlling the lateral position of a tape head of a magnetic tape drive. The tape head comprises at least two sensors adapted to determine a signal from a magnetic tape. The magnetic tape comprises at least two servo bands, the servo bands comprising position marks indicative of a lateral position of the tape head relative to the magnetic tape. Herein the position marks provide identical lateral position information for each servo band of the magnetic tape. For reading data from the magnetic tape, the tape head is in physical contact with the magnetic tape. This physical contact causes a longitudinal oscillation of the magnetic tape in case the magnetic tape is passing the tape head with a velocity which is non-zero, the oscillation having a frequency f.

The method then comprises determining a first servo signal by reading the position marks from a first servo band using a first sensor, and determining a second servo signal by reading the position marks from a second servo band using a second sensor The first servo signal is delayed relative to the second servo signal by a delay $\Delta t$, the delaying resulting in a delayed second servo signal. Herein the delay $\Delta t$ is chosen dependent on the frequency f of the longitudinal oscillation of the magnetic tape. Using the thus determined information the average signal of the first servo signal and the delayed second servo signal is determined and servo information is determined from the average signal. The servo information is indicative of a deviation of the lateral position of the tape head from an ideal lateral position of the tape head relative to the magnetic tape. The tape head is then controlled to readjust its lateral position such that the determined deviation is decreased.

The "lateral" relative to the magnetic tape as understood herein is a position in the plain of the tape along an axis which extends in a direction which is perpendicular to the longitudinal direction in which the magnetic tape is transported upon operation of the magnetic tape drive.

The servo bands may for example comprise marks, which can be understood as magnetically oriented lines, extending in a lateral direction, wherein the lines which are also called "servo stripes" are slightly tilted relative to the lateral direction with a predefined azimuth angle. These oriented lines may be arranged in a first set of lines having a first tilting angle and a second set of lines having a second tilting angle. A set of lines or servo stripes with the same azimuth angle is usually called a "servo burst" or "burst of stripes". For example the second tilting angle may be the same tilting angle as the first tilting angle but mirrored with respect an axis extending along the lateral axis of the magnetic tape. Both the first set of lines and the second set of lines may comprise for example 4 lines. Detecting such a set of lines by one of the sensors will result in a signal burst. In case the first set of lines and the second set of lines are arranged next to each other, the time distance between the detection of two bursts will depend on the lateral position of the sensor relative to the tape head. By placing arrangements of such first and second sets of lines with a predetermined constant distance along the servo band will thus allow for determining the lateral position of the tape head, as the period of the determined servo-signal will change in case the lateral position of the tape head changes.

In case the magnetic tape oscillates in a longitudinal direction due to tape head friction during tape transport, the servo-signal may be superimposed by a periodic disturbance signal. This may under some circumstances lead to a servo-signal which is indicative of an erroneous lateral position of the tape head, as the sampling of the servo signal with the superimposed disturbance signal may resemble a servo signal with an altered frequency. Thus the lateral position of the tape head may be controlled in accordance with a servo-signal which does not represent the actual lateral position of the tape head.

However by determining the servo signal using two sensors this problem may be overcome by delaying one of the servo signals and combining the first servo-signal with the delayed second servo-signal. In case the delay $\Delta t$ equals an odd-numbered multiple of half the inverse frequency $$\left(\Delta t = n \times \frac{1}{2f}, \text{ where } n = 1, 3, 5, \ldots\right)$$

the disturbance signal comprised in the first servo-signal and the disturbance signal comprised in the delayed second servo-signal will cancel out completely if the two servo-signals are combined (averaged). Thus embodiments may have the advantage, that by delaying one of the two servo-signals and combining the servo-signals, the detrimental effect of the longitudinal oscillation of the magnetic tape due to tape head friction can be mitigated.

In some embodiments the delay $\Delta t$ is chosen as $$\Delta t = n \times \frac{1}{2f} \pm \delta, \text{ where } n = 1, 3, 5 \ldots \text{ and } 0 \leq \delta \leq \frac{1}{6f}$$

Embodiments may have the advantage that the disturbance signal comprised in the first servo-signal and the disturbance signal comprised in the delayed second servo-signal will at least partially cancel out if the two servo-signals are combined (averaged). The range $$0 < \delta \leq \frac{1}{6f}$$

means that the disturbances will be 180°±0 . . . 60° degrees out of phase relative to the frequency f of the disturbance. This partial suppression of the disturbance by averaging may be of interest if the delay $\Delta t$ cannot be chosen arbitrarily, but only in quantized steps due to implementation constraints.

In some embodiments the delay $\Delta t$ is chosen as $1/2f$, which is the minimal delay necessary two achieve a cancellation of the two disturbance signals. Embodiments may have the advantage that by using a minimal delay the actual servo-signals determined by the first and second sensor are obtained without requiring a large spatial displacement of the two sensors. Assume for example a case in which the delay $\Delta t$ exceeds the period of a determined set of bursts, also known as a servo sub-frame, in the servo signal. In this case combining the first servo-signal and the delayed second servo-signal may result in a combined servo-signal spanning effectively two or more servo sub-frames.

In some embodiments, the delay $\Delta t$ is caused by a relative spatial displacement $\Delta s$ of one of the sensors with respect to the other sensor in longitudinal direction of the magnetic tape. As the magnetic tape is usually transported from the cartridge reel to the take up reel with a predefined longitudinal tape velocity $v_t$ a spatial displacement $\Delta s$ will result in a temporal displacement $\Delta t$ of the signals determined at the first and second sensor. In this case the spatial displacement $\Delta s$ can be determined by $\Delta s = v_t * \Delta t$. Using a spatial displacement may have the advantage, that no internal circuitry for delaying or re-sampling of one of the servo-signals has to be provided by the magnetic tape drive. One of the servo-signals will always be delayed relative to the other servo-signal as soon as the servo-signal is determined.

In order to determine spatial displacement $\Delta s$ the method may in some embodiments further comprise the steps of determining the longitudinal velocity $v_t$ of the magnetic tape, and determining the spatial displacement $\Delta s$ as a function of the delay $\Delta t$ and the determined longitudinal velocity $v_t$ of the magnetic tape. The determination of the spatial displacement may for example be carried out by the tape drive itself.

In some further embodiments, the spatial displacement $\Delta s$ is caused by a tilting of the tape head by an angle $\psi$ around an axis, the axis being perpendicular to the plane of the magnetic tape. The spatial displacement $\Delta s$ and thus the delay $\Delta t$ for a given tilting angle $\psi$ can then be determined using the lateral distance between the sensors and applying trigonometric functions. For small tilting angles $\psi$ the used trigonometric functions may even be approximated using linear functions thereby facilitating the determination of the tilting angle $\psi$. Using a tilted tape head having a defined skew may be an easy way to introduce a longitudinal displacement $\Delta s$ between the sensors of the tape head. Further it may be possible to easily adapt the skew of the tape head by rotating the tape head, for example in case the oscillation frequency f of the longitudinal oscillation of the magnetic tape changes with tape media parameter or material modifications. Using a skewed tape head to achieve a spatial displacement $\Delta s$ may specifically be advantageous if more than two servo channels are used. In case the sensors are arranged with constant distances seen in lateral direction of the magnetic tape the introduction of a skewing angle in the tape head will result in equal spatial displacements $\Delta s$ between adjacent sensors of the tape head. Thus it is not necessary to apply a delay to each individual servo-signal.

In order to determine the angle $\psi$ necessary to cancel out the disturbance when combining the servo-signals, the method in accordance with some embodiments may further comprise the steps of determining the longitudinal velocity of the magnetic tape, and determining the angle $\psi$ as a function of the delay $\Delta t$, the lateral distance between the first and second servo sensor, and the determined longitudinal velocity of the magnetic tape.

In some embodiments, the magnetic tape drive is operatively coupled to a data storage unit, the data storage unit comprising a look-up table comprising the delays $\Delta t$ for a predefined number of media types. The determination of the delay $\Delta t$ in this case comprises accessing the look-up table and determining the delay $\Delta t$ from the entry of the look-up table corresponding to the determined media type. A "media type" as understood herein may be information describing the magnetic tape cartridge which is currently in use. The main factors which influence the frequency f of the longitudinal oscillation of the magnetic tape when being transported from the cartridge reel to the take up reel are the distance between the rollers guiding the magnetic tape in the region of the tape head and the bulk sound velocity of the medium of the magnetic tape itself. As these factors will be the same for a certain type of cartridge, it may be sufficient to determine the cartridge type to get information of the frequency of the longitudinal oscillation of the magnetic tape for this kind of cartridge. As the delay $\Delta t$ necessary to cancel out the disturbance when combining the servo signals depends on the frequency of the longitudinal oscillation it may be sufficient to determine the type of cartridge to determine the necessary delay $\Delta t$.

In some embodiments, the data storage unit may comprise a look-up table comprising the spatial displacement $\Delta s$ for a predefined number of longitudinal velocities $v_t$ of the magnetic tape and media type. The determination of the spatial displacement $\Delta s$ then comprises accessing the look-up table and determining the spatial displacement $\Delta s$ from the entry of the look-up table corresponding to the determined longitudinal velocity $v_t$ of the magnetic tape and media type. As described before, the media type may indicate the expected frequency of the longitudinal oscillation of the magnetic tape upon transporting the magnetic tape from a cartridge reel to a take up reel and reading information from the tape using a tape head which is in physical contact to the surface of the magnetic tape. The delay $\Delta t$ however directly corresponds to the spatial displacement $\Delta s$ of the sensors of the tape head by $\Delta s = v_t * \Delta t$. Thus the spatial displacement can either be determined on the fly for a currently measured tape velocity $v_t$ or may be determined by reading a table comprising corresponding information. As accessing a look-up table will cause a reduced computational effort compared to the determination of the spatial displacement $\Delta s$ using a look-up table may have the advantage that the magnetic tape drive can be unburdened from at least some computational effort.

In the same way the data storage unit may comprise a look-up table comprising the angle $\psi$ for a predefined number of longitudinal velocities $v_t$ of the magnetic tape and media type. The determination of the angle $\psi$ may then comprise accessing the look-up table and determining the angle $\psi$ from the entry of the look-up table corresponding to the determined longitudinal velocity of the magnetic tape and media type.

In another aspect the present invention relates to a magnetic tape drive for reading data from a magnetic tape using a tape head, the tape head comprising at least two sensors adapted to determine a signal from a magnetic tape. The magnetic tape comprises at least two servo bands, the servo bands comprising position marks indicative of a lateral position of the tape head relative to the magnetic tape. The position marks herein provide identical lateral position information for each servo band of the magnetic tape. For reading data from the magnetic tape, the tape head is in physical contact with the magnetic tape, the physical contact causing a longitudinal oscillation of the magnetic tape in case the magnetic tape is passing the tape head with a velocity which is non-zero. The oscillation has a frequency f.

In one embodiment, the magnetic tape drive is adapted to: determine a first servo signal by reading the position marks from a first servo band using a first sensor; determine a second servo signal by reading the position marks from a second servo band using a second sensor; delay the first servo signal relative to the second servo signal by a delay $\Delta t$, the delaying resulting in a delayed second servo signal, the delay $\Delta t$ depending on the frequency f of the longitudinal oscillation of the magnetic tape; determine the average signal of the first servo signal and the delayed second servo signal; determine a servo information from the average signal, the servo information being indicative of a deviation of the lateral position of the tape head from an ideal lateral position of the tape head relative to the magnetic tape, and readjust the lateral position of the tape head such that the determined deviation is decreased.

In yet another embodiment the invention relates to a computer program product comprising machine executable instructions for performing the method as described above.

FIG. 1 depicts a schematic of the readout section of a magnetic tape drive. The magnetic tape 102 is transported from a cartridge reel (not shown) to a take-up reel (not shown) wherein the magnetic tape 102 is guided by a set of rollers 104. The magnetic tape 102 can both be transported from left to right or from right to left. The magnetic tape which may for example have a width of half an inch may for example comprise a plurality of tracks comprising data. The magnetic tape 102 may further comprise servo bands 114 comprising information for controlling the lateral position of the tape head 108 of the magnetic tape drive relative to the magnetic tape 102. As is illustrated in FIG. 1 the tape head 108 may for example comprise two sensors 110 and 112 which are located in different lateral positions of the tape head 108 and correspondingly of the magnetic tape 102.

In the upper left corner of FIG. 1 a coordinate system is defined for FIG. 1. The "lateral" direction as understood herein extends along the x-axis, while the longitudinal direction of the magnetic tape 102 extends along the y-axis. The z-axis is perpendicular to the plane of the magnetic tape 102.

When reading the contents of the magnetic tape 102 the magnetic tape 102 is transported with a predefined velocity from the cartridge reel to the take-up reel. As the rollers 104 do not comprise any elements allowing for a lateral guidance of the magnetic tape 102 the lateral position of the magnetic tape 102 when being transported from the cartridge reel to the take-up reel may continuously change. As a result it is necessary to continuously realign the tape head 108 with the lateral position of the magnetic tape 102.

Figure 2:
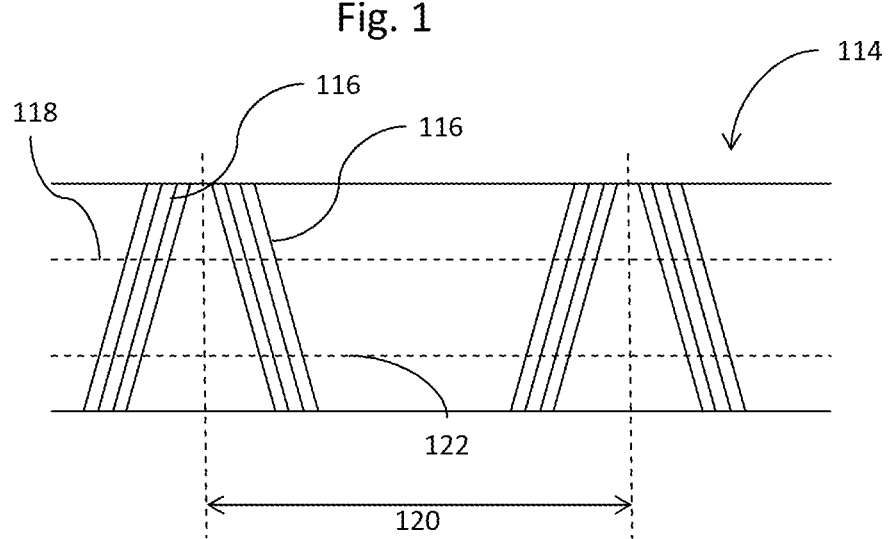
FIG. 2 depicts a schematic of the servo pattern comprised in a magnetic tape.

To this end a servo read back signal is determined using the information comprised in the servo bands 114. A schematic of the information comprised in a servo band 114, representing a servo frame, is given in FIG. 2. The illustrated servo band 114 may for example comprise a plurality of magnetically oriented lines 116 which are tilted relative to the lateral direction of the magnetic tape 102. For example as illustrated in FIG. 2 there may be sets of four magnetically oriented lines 116 wherein two sets of lines 116 are arranged in close vicinity to each other. Herein a first set of lines 116 may have a first tilting angle while the second set of lines 116 may have the same tilting angle but mirrored with respect to the lateral direction of the magnetic tape 102.

Now assume for example that a sensor 110 of the tape head 108 will read the information comprised in the servo band 114 wherein the lateral position of the sensor 110 is chosen such that the sensor only registers the information along the upper dashed line 118. In this case the sensor 110 will read out information bursts wherein the bursts caused by adjacent sets of magnetically oriented lines 116, having opposite azimuthal angle, will have a defined temporal distance and wherein the set of bursts of two adjacent sets of lines 116, having identical azimuthal angle, will always have the same period as defined by the longitudinal distance of the lines 116 on the magnetic tape 102 as illustrated by the arrow 120 in FIG. 2.

In case the magnetic tape 102 now travels for example in an upward direction as seen in FIG. 1 the sensor 110 may for example travel along the lower dashed line 122 and as a result will receive a servo signal with different lateral position information. As can be seen in FIG. 2 the time distance of sets of bursts from lines having identical azimuthal angle does not change, however the distance between adjacent sets of lines having opposite azimuthal angle depends on the lateral position of the sensor 110. As a result as the magnetic tape 102 travels upwards the time interval between the bursts of one set of bursts will increase giving information about the lateral position of the magnetic tape 102 relative to the sensors 110 or 112 of the tape head 108. This information can be used to realign the tape head 108 with the magnetic tape 102.

Usually a tape head 108 will have to be in physical contact with the magnetic tape 102 in order to read out the information comprised in the tracks of the magnetic tape 102. As a result there will always be a certain amount of friction between the tape head 108 and the magnetic tape 102. This tape head friction may lead to a longitudinal oscillation of the magnetic tape 102 as the magnetic tape 102 will tend to shortly stick to the tape head and then travel on with an increased velocity due to the tension caused in the magnetic tape. The effect can basically be compared to the effect which causes a violin to sound as soon as a violin bow sweeps over the strings of the violin.

Figure 3:
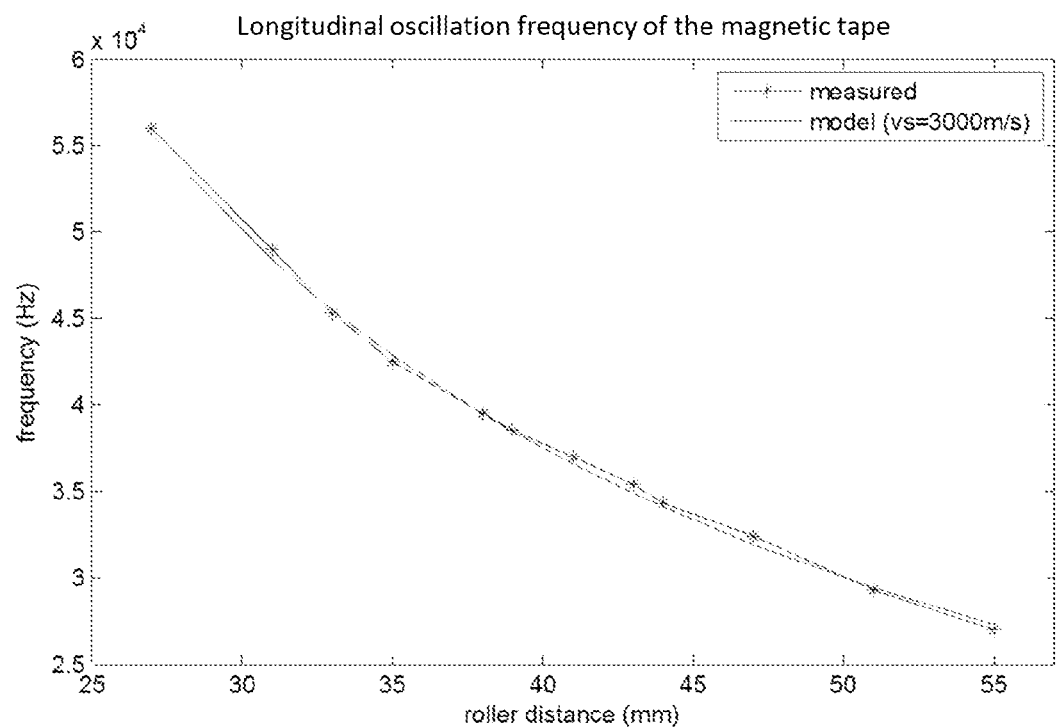
FIG. 3 depicts a diagram illustrating the dependence of the frequency of a longitudinal disturbance over the distance of the tape rollers.

The result of such a longitudinal oscillation of the magnetic tape will be a disturbance in the position error signal which is determined using the information of the servo bands 114 as has been described before. The frequency of the disturbance may depend on a plurality of factors. As is illustrated in FIG. 3 it has been found that the distance between the rollers 104 may influence the frequency of the disturbance. FIG. 3 gives a diagram illustrating the frequency of the disturbance over the distance of the rollers 104. As can be seen in the diagram the frequency of the disturbance will decrease with an increasing distance between the rollers 104. As is further illustrated in FIG. 3 the frequency of the disturbance may for example be in a range between 55 kHz and 30 kHz for usual roller distances.

Figure 4:
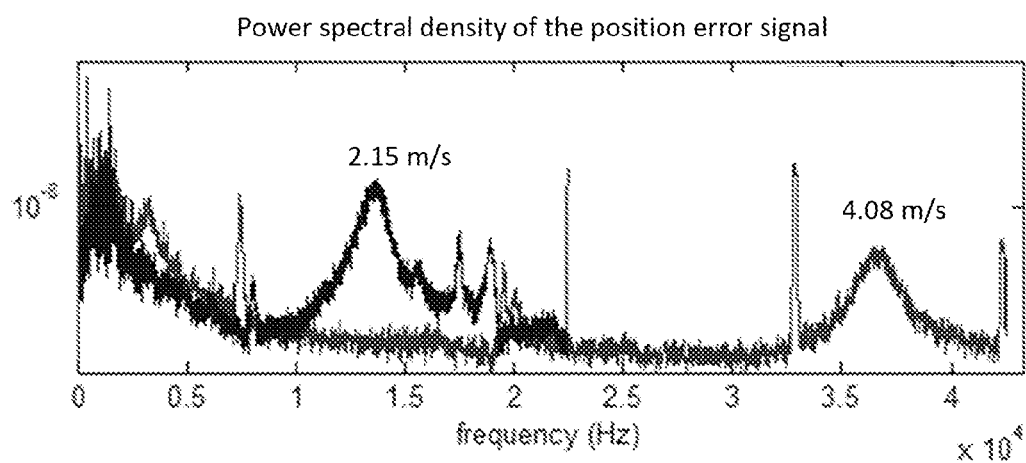
FIG. 4 depicts a diagram illustrating the power spectral density of the position error signal over the frequency.

The effect of such a disturbance is illustrated in FIG. 4. FIG. 4 depicts the power spectral density of a position error signal as a function of frequency for a range up to 40 kHz for two given tape velocities. For a tape velocity of 4.08 m/s a disturbance caused by the compressional wave oscillating within the magnetic tape 102 can be observed at a frequency of approximately 36 kHz. This disturbance may cause a degradation of the standard deviation of the position error signal and thus hinder the performance of the track-following servo loop of the tape head 108. This becomes specifically apparent for the power spectral density for a tape velocity of 2.15 m/s which is also illustrated in FIG. 4. As can be seen the disturbance caused by the compressional wave oscillating within the magnetic tape 102 has shifted to a frequency of approximately 14 kHz. However the tape velocity should not influence the frequency of the disturbance itself. The reason why the disturbance caused by the compressional wave has been registered at a frequency of 14 kHz is, that for low tape velocity the sampling rate of the servo loop, i.e., the rate at which samples carrying information about the lateral position are generated, is decreased, and as a result the disturbance at 36 kHz alias into the frequency of approximately 14 kHz. For even lower tape speeds or higher compressional wave frequencies, the disturbance signal may alias into the frequency range from 0.8 kHz to 4 kHz where the servo control loop amplifies disturbances. As a result the servo loop will receive a signal wherein the frequency of the disturbance has been shifted to lower frequencies which may be mistaken for an actual position error signal. As a result the servo loop might follow a signal which does not represent the actual lateral position of the tape head. Low tape speeds and/or low servo sampling rates may lead to an even larger degradation of the performance of the track-following servo loop.

It has been found that the longitudinal oscillation of the magnetic tape 102 which is caused by tape head friction creates a disturbance of the signal in the sensors 110 which has a sinusoidal shape as is illustrated in FIG. 1 at the schematic 124. This sinusoidal signal is added to the signal which is determined from the servo patterns in the bands 114. As is further indicated in FIG. 1 by slightly tilting the tape head 108 the disturbance signals which are registered by the upper sensor 110 and the lower sensor 112 caused by the longitudinal oscillation of the magnetic tape 102 can be slightly shifted relative to each other. This shifting of signals is further illustrated in FIG. 5.

Figure 5:
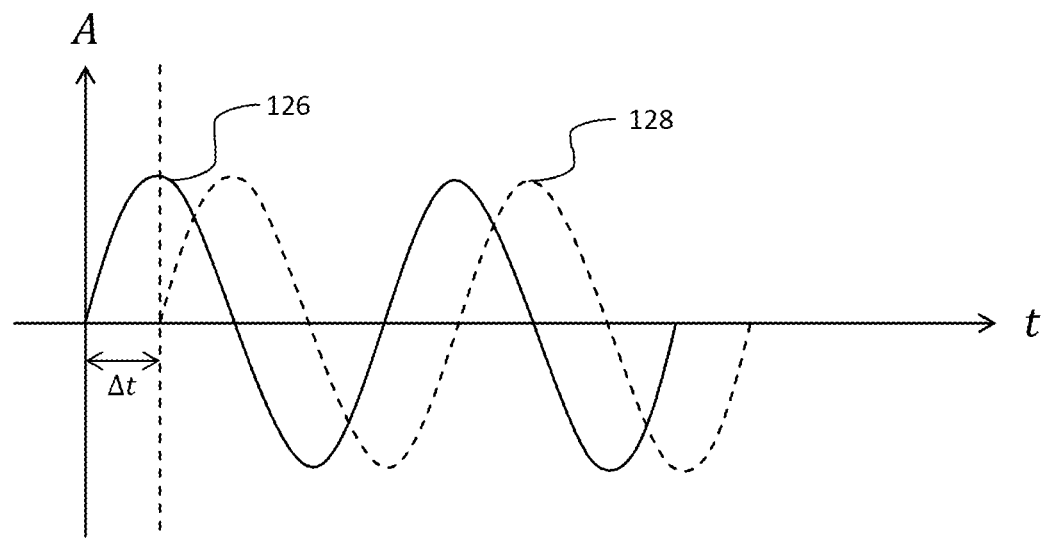
FIG. 5 depicts a schematic of two harmonic signals for different temporal delays.
Figure 5:
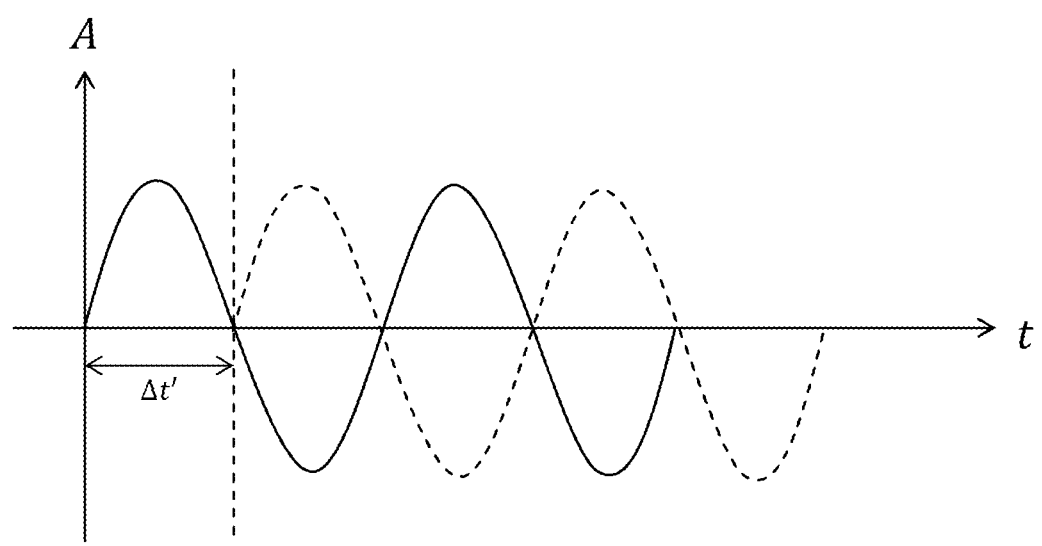

FIG. 5 depicts two diagrams for a first sinusoidal signal 126 which is illustrated by a continuous line and second sinusoidal signal 128 which is illustrated by a dashed line. Assume now that the first signal 126 is the disturbance signal registered by the sensor 110 while the second disturbance signal 128 is registered by the lower sensor 112. Assuming that the sensor 110 and the sensor 112 were perfectly aligned in lateral direction of the magnetic tape 102 the two disturbance signals 126 and 128 would be perfectly in phase. By slightly tilting the tape head 108 a delay Δt between the first signal 126 and the second signal 128 can be created as for example the upper sensor 110 will experience the disturbance a little sooner than the lower sensor 112.

As is illustrated in FIG. 5 in the lower diagram it may even be possible to introduce a delay Δt' which introduces a phase shift of 180° between the first signal 126 and the second signal 128. If now the signal registered by the upper sensor 110 and the signal registered by the lower sensor 112 are averaged the disturbance signal will average to 0. However by introducing a phase shift between the first signal 126 and the second signal 128 which is in the range of 180°±60° at least a partial cancellation of the disturbance signal may be achieved when combining the first signal 126 and the second signal 128 which might already improve the performance of the track-following servo loop.

Figure 6:
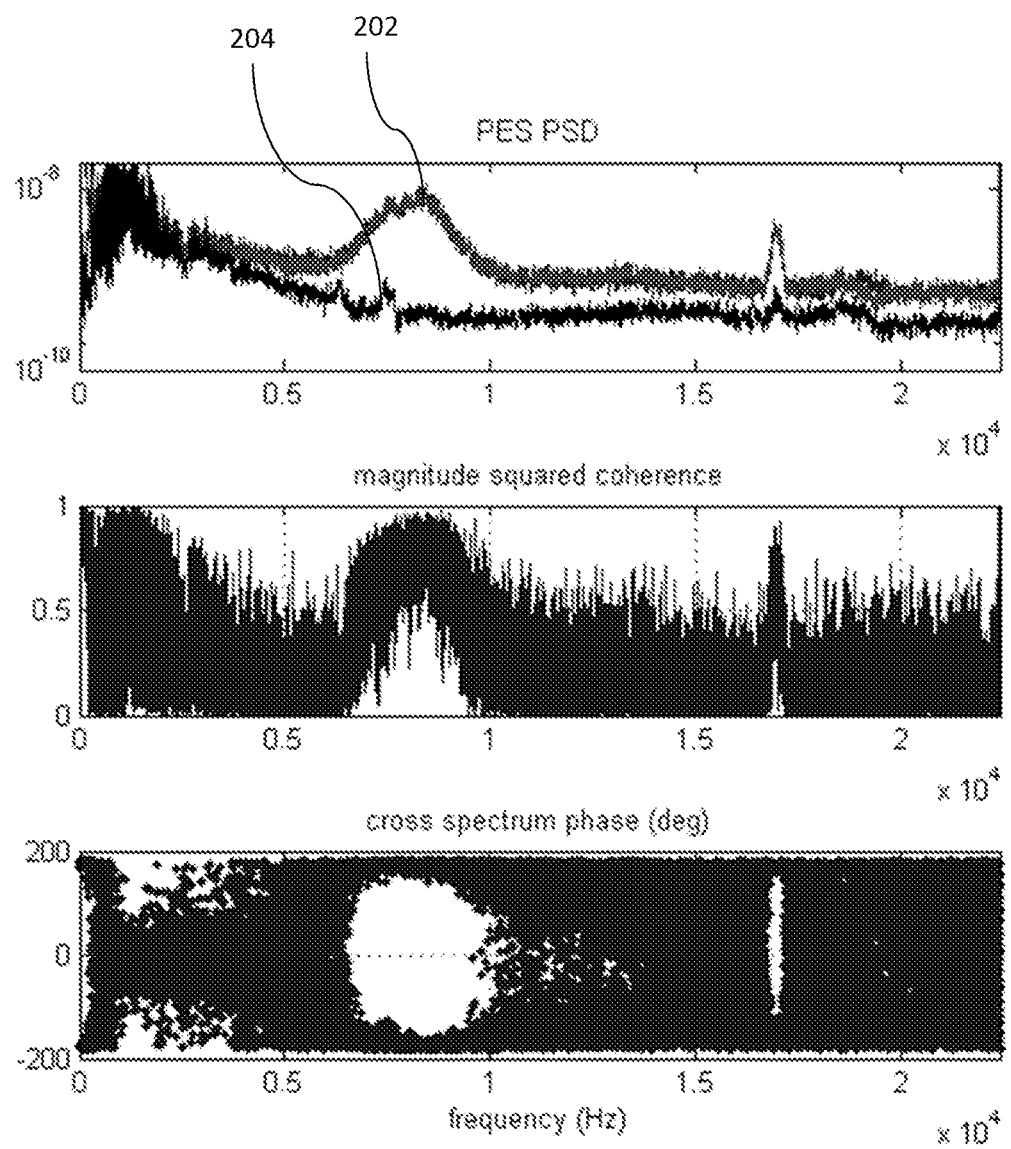
FIG. 6 depicts the results of measurements showing the effect of a delay introduced in one of the servo signals.

The effect of a phase shift of 180° between the first and the second servo signal with respect to the superimposed disturbance signal is illustrated in FIG. 6.

FIG. 6 depicts the power spectral density (PSD) of the position error signal (PES) observed on two servo channels, that is, the error signals between the target position and the positions observed by the two sensors 110 and 112. As can be seen the signals 202 themselves show a disturbance at approximately 8 kHz which is caused by the longitudinal oscillation of the magnetic tape 102 due to the tape head friction. However, in the same diagram the combined position error signal 204 is illustrated wherein it can be seen that the disturbance at 8 kHz is suppressed when the signals of the first and the second servo channel are combined. This observance is also confirmed by the diagrams of FIG. 6 illustrating the magnitude squared coherence of the first and the second servo channel position error signals over the frequency as well as the cross-spectrum phase of the position error signals of the first and second servo channel. As can be seen, especially the cross-spectrum phase indicates that the phase difference between the first and the second servo channel signals is 180° for a frequency of approximately 8 kHz. As a result, when combining the position error signals of the first servo channel and the second servo channel the disturbance at 8 kHz will cancel out.

As a result, in order to reduce the effect of a disturbance in the position error signal caused by the longitudinal oscillation of the magnetic tape 102 caused by tape head friction, one has to introduce a phase shift between the signal of a first servo channel and a second servo channel which equals to 180° relative to the frequency f of the disturbance. The frequency of the disturbance itself depends for example on the distance of the rollers 104 which has been described before and the bulk sound velocity in the tape medium of the magnetic tape 102.

Figure 7:
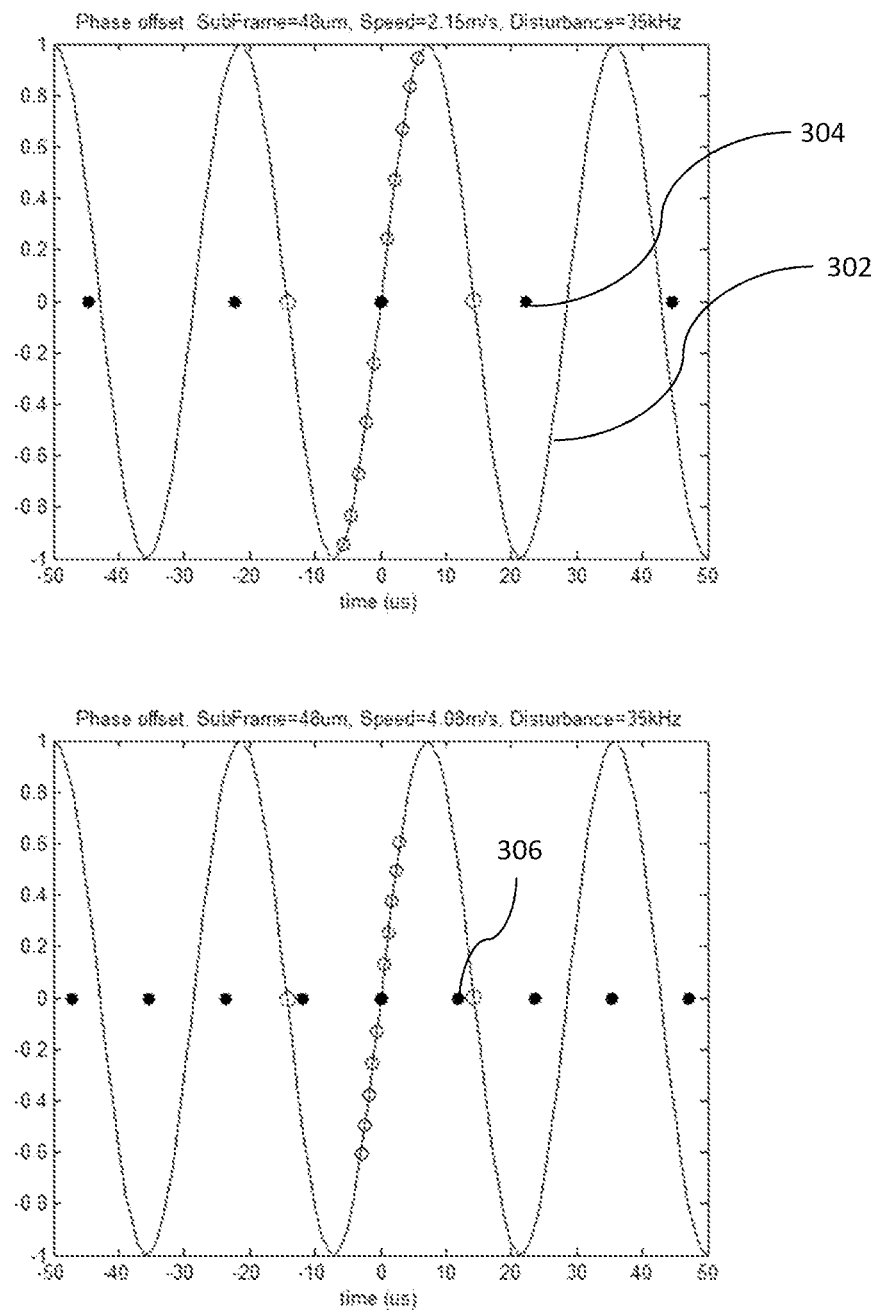
FIG. 7 depicts two diagrams illustrating the necessary delay for cancelling a disturbance.

FIG. 7 depicts the amplitude of an exemplary disturbance signal over time for a disturbance having a frequency of 35 kHz. The disturbance is illustrated by the sinusoidal signal 202 while the sampling times of the servo loop are illustrated as massive dots 204. FIG. 7 depicts two examples for a tape speed of 2.15 m/s and a tape speed of 4.08 m/s. In the example of a tape velocity of 2.15 m/s it can be seen that by introducing a temporal delay of approximately 15 µs between the position error signal of the first sensor 110 and the position error signal of the second sensor 112 a 180° phase shift with regard to the disturbance signal can be introduced.

Figure 8:
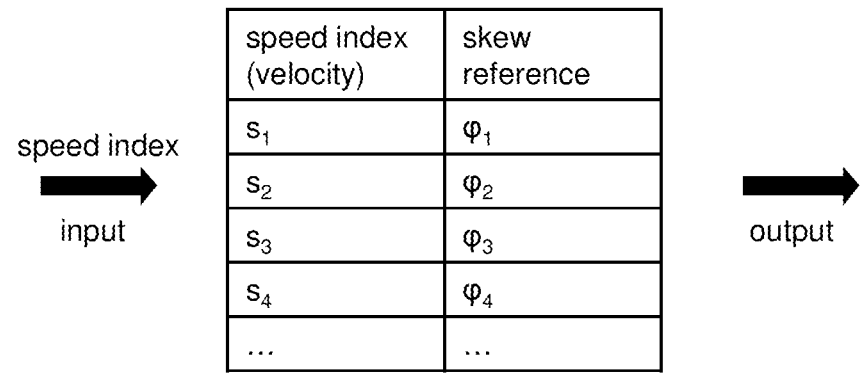
FIG. 8 depicts schematics of three embodiments of tables for determining delay values.
Figure 8:
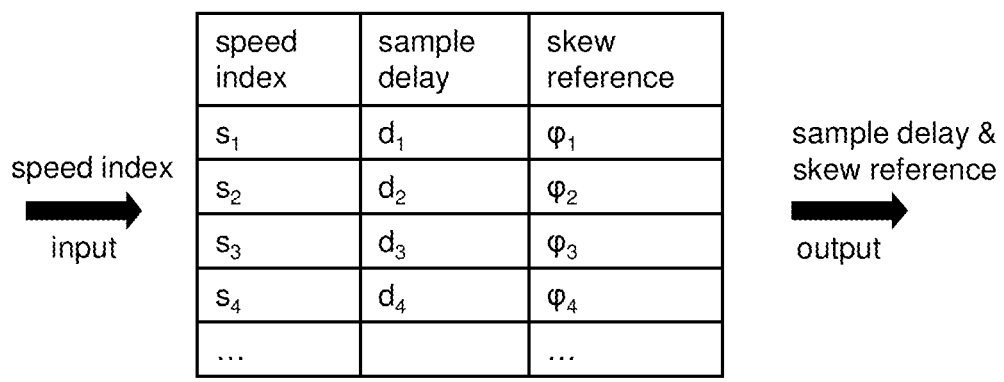
Figure 8:
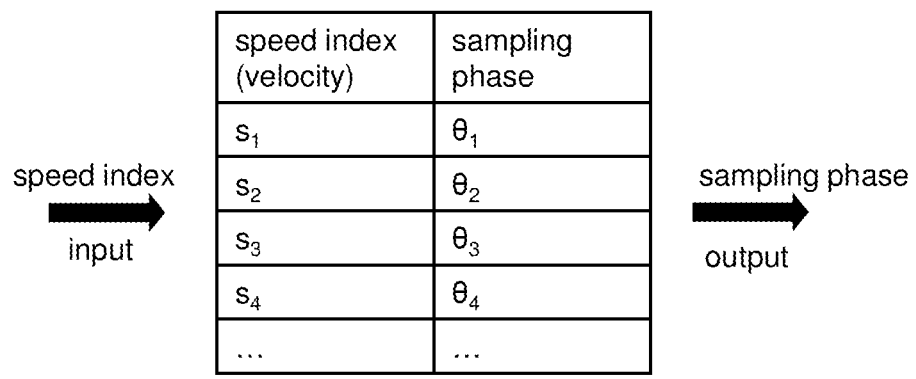

In accordance with embodiments of the invention there are basically three approaches to create such a phase shift by introducing a temporal delay between the signal of the first servo channel and the second servo channel. These three embodiments are depicted in FIG. 8. In a first embodiment which has already been described it may be possible to introduce a skew in the tape head 108 by tilting the tape head thereby shifting the sensor 110 determining the first servo signal relative to the sensor 112 determining the second servo signal in longitudinal direction of the magnetic tape 102.

As the magnetic tape 102 is transported from the cartridge reel to the take-up reel with a predefined velocity a spatial displacement of the first sensor relative to the second sensor in longitudinal direction of the magnetic tape 102 results in a temporal displacement (delay) of the position error signal determined by the first sensor relative to the position error signal determined by the second sensor. Thus by using a corresponding skew angle a phase shift of 180° between the disturbances of the two servo signals can be introduced. As has been described previously the skew which is necessary to cancel out the disturbance will depend on the velocity of the magnetic tape 102. Thus it may be possible to create a table comprising entries for the necessary skew to cancel out the disturbance for a given tape velocity for given media parameters of the cartridge comprising the magnetic tape like bulk sound velocity of the magnetic tape and tape path parameters comprising roller spacing. During operation of the tape drive it may then be sufficient to determine the velocity of the magnetic tape which can also be denoted as a speed index and determine the corresponding skew reference necessary to cancel out the disturbance from the table which may for example be comprised in the magnetic tape drive. By applying the thus determined skew reference the detrimental effect of the longitudinal oscillation of the magnetic tape 102 may be mitigated.

Coming back to FIG. 7 in a second example, again the disturbance signal over time and the sampling times for a given tape velocity are illustrated. In the case depicted in the lower diagram the velocity of the magnetic tape 102 is 4.08 m/s resulting in an increased sampling rate compared to the upper diagram. As can be seen in FIG. 7 in the lower diagram again a delay of approximately 15 µs would result in a 180° phase shift in the disturbance as the frequency of the disturbance did not change. However, it can also be seen that the 180° phase shift can also be introduced by skipping one sample illustrated by the black dot 306 and subsequently only use a relatively small temporal displacement of approximately 3 µs. This is also depicted in FIG. 8 in the second embodiment wherein for a given speed index a sample delay and a skew reference value are given in a table which may be comprised in the tape drive. Using a delay of one or more sampling intervals in combination with a skew reference may have the advantage that the skew angle can be kept very low compared to the case where no sample is skipped and the entire phase shift has to be achieved by tilting the tape head 108. This may be specifically advantageous as a tilting of the tape head 108 will result in a slight degradation of the quality of the error signal which is determined in combined mode of the first and the second servo channel.

In yet a third embodiment, which is also depicted in FIG. 8, it may also be possible to shift the sampling phase by interpolating the samples carrying the information on the lateral position that are generated by one servo channel, thereby effectively shifting the first servo signal relative to the second servo signal. Using a shift of the sampling phase obtained by interpolation may have the advantage that the skew angle of the tape head 108 remains to be 0 resulting in an improved quality of the determined position error signal.

However, it has to be noted that it is not necessary to use tables comprising pre-calculated values for a skew reference, a sample delay or a sampling phase for a given speed index of the magnetic tape 102. It may also be possible to adapt the magnetic tape drive to determine the velocity of the magnetic tape 102 and determine the corresponding values for a skew reference, a sample delay or a sampling phase on the fly. However, the choice whether to use predefined tables which are stored in the tape drive or to determine the corresponding values of the tables on the fly depends on the computational effort for determining the values and the corresponding computational capabilities of the magnetic tape drive.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for controlling a lateral position of a tape head of a magnetic tape drive, the method comprising:
   determining a first servo signal by reading position marks from a first servo band on a magnetic tape using a first sensor,
   determining a second servo signal by reading position marks from a second servo band on the magnetic tape using a second sensor,
   delaying the first servo signal relative to the second servo signal by a delay to create a delayed second servo signal, wherein the delay is based on the frequency (f) of a longitudinal oscillation of the magnetic tape,
   calculating an average signal based on the first servo signal and the delayed second servo signal,
   determining a servo information from the average signal, the servo information being indicative of a deviation of the lateral position of the tape head from an ideal lateral position of the tape head relative to the magnetic tape, and
   controlling the tape head to adjust its lateral position such that the deviation is decreased.

2. The method of claim 1, the delay (Δt) is chosen such that $$\Delta t = n \times \frac{1}{2f} \pm \delta, \text{ where } n = 1, 3, 5 \ldots \text{ and } 0 \le \delta \le \frac{1}{6f},$$

wherein δ is a disturbance.

3. The method of claim 1, wherein the delay Δt is $$\Delta t = \frac{1}{2f}.$$

4. The method of claim 1, wherein the delay Δt is caused by a relative spatial displacement Δs of one of the sensors with respect to the other sensor in longitudinal direction of the magnetic tape.

5. The method of claim 4 further comprising:
determining the longitudinal velocity of the magnetic tape; and
determining the spatial displacement Δs as a function of the delay Δt and the determined longitudinal velocity of the magnetic tape.

6. The method of claim 4, wherein the spatial displacement Δs is caused by a tilting of the tape head by an angle ψ around an axis, the axis being perpendicular to the plane of the magnetic tape.

7. The method of claim 6 further comprising:
determining the longitudinal velocity of the magnetic tape; and
determining the angle γ as a function of the delay Δt, the lateral distance between the first and second servo sensor, and the determined longitudinal velocity of the magnetic tape.

8. The method of claim 1, wherein the delay Δt is caused by introducing a delay in the second servo signal after determination of the second servo signal.

9. The method of claim 1, wherein the magnetic tape drive is in communication with to a data storage unit, the data storage unit comprising a look-up table comprising the delays Δt for a predefined number of media types, the determination of the delay Δt comprising accessing the look-up table and determining the delay Δt from the entry of the look-up table corresponding to the determined media type.

10. The method of claim 5, wherein the magnetic tape drive is in communication with to a data storage unit, the data storage unit comprising a look-up table comprising the spatial displacement Δs for a predefined number of longitudinal velocities of the magnetic tape and media type, the determination of the spatial displacement Δs comprising accessing the look-up table and determining the spatial displacement Δs from the entry of the look-up table corresponding to the determined longitudinal velocity of the magnetic tape and media type.

11. The method of claim 7, wherein the magnetic tape drive is in communication with to a data storage unit, the data storage unit comprising a look-up table comprising the angle ψ for a predefined number of longitudinal velocities of the magnetic tape and media type, the determination of the angle ψ comprising accessing the look-up table and determining the angle ψ from the entry of the look-up table corresponding to the determined longitudinal velocity of the magnetic tape and media type.

12. A computer program product for controlling a lateral position of a tape head of a magnetic tape drive, the computer program product comprising:
a non-transitory storage medium readable by a processing circuit and storing instructions for execution by the processing circuit for performing a method comprising:
determining a first servo signal by reading position marks from a first servo band on a magnetic tape using a first sensor,
determining a second servo signal by reading position marks from a second servo band on the magnetic tape using a second sensor,
delaying the first servo signal relative to the second servo signal by a delay to create a delayed second servo signal, wherein the delay is based on the frequency (f) of a longitudinal oscillation of the magnetic tape,
calculating an average signal based on the first servo signal and the delayed second servo signal,
determining a servo information from the average signal, the servo information being indicative of a deviation of the lateral position of the tape head from an ideal lateral position of the tape head relative to the magnetic tape, and
controlling the tape head to adjust its lateral position such that the deviation is decreased.

13. The computer program product of claim 12, the delay (Δt) is chosen such that $$\Delta t = n \times \frac{1}{2f} \pm \delta, \text{ where } n = 1, 3, 5 \ldots \text{ and } 0 \leq \delta \leq \frac{1}{6f},$$

wherein δ is a disturbance.

14. The computer program product of claim 12, wherein the delay Δt is $$\Delta t = \frac{1}{2f}.$$

15. The computer program product of claim 12, wherein the delay Δt is caused by a relative spatial displacement Δs of one of the sensors with respect to the other sensor in longitudinal direction of the magnetic tape.

16. The computer program product of claim 15 further comprising:
determining the longitudinal velocity of the magnetic tape; and
determining the spatial displacement Δs as a function of the delay Δt and the determined longitudinal velocity of the magnetic tape.

17. The computer program product of claim 15, wherein the spatial displacement Δs is caused by a tilting of the tape head by an angle ψ around an axis, the axis being perpendicular to the plane of the magnetic tape.

18. The computer program product of claim 17 further comprising:
determining the longitudinal velocity of the magnetic tape; and
determining the angle ψ as a function of the delay Δt, the lateral distance between the first and second servo sensor, and the determined longitudinal velocity of the magnetic tape.

19. The computer program product of claim 12, wherein the delay Δt is caused by introducing a delay in the second servo signal after determination of the second servo signal.

20. A magnetic tape drive for reading data from a magnetic tape using a tape head, the tape head comprising at least two sensors adapted to determine a signal from a magnetic tape, the magnetic tape comprising at least two servo bands, the servo bands comprising position marks indicative of a lateral position of the tape head relative to the magnetic tape, the position marks providing identical lateral position information for each servo band of the magnetic tape, the tape head being in physical contact with the magnetic tape, the physical contact causing a longitudinal oscillation of the magnetic tape in case the magnetic tape is passing the tape head with a velocity which is non-zero, the oscillation having a frequency f, the magnetic tape drive being adapted to:
determine a first servo signal by reading the position marks from a first servo band using a first sensor,
determine a second servo signal by reading the position marks from a second servo band using a second sensor,
delay the first servo signal relative to the second servo signal by a delay, the delaying resulting in a delayed second servo signal, the delay depending on the frequency f of the longitudinal oscillation of the magnetic tape,
determine the average signal of the first servo signal and the delayed second servo signal,
determine a servo information from the average signal, the servo information being indicative of a deviation of the lateral position of the tape head from an ideal lateral position of the tape head relative to the magnetic tape, and
re-adjust the lateral position of the tape head such that the determined deviation is decreased.

* * * * *